US006481855B2

(12) United States Patent
Oehler

(10) Patent No.: US 6,481,855 B2
(45) Date of Patent: Nov. 19, 2002

(54) KEYSTONE DISTORTION CORRECTION SYSTEM FOR USE IN MULTIMEDIA PROJECTORS

(75) Inventor: Peter R. Oehler, Beaverton, OR (US)

(73) Assignee: InFocus Corporation, Wilsonville, OR (US)

( * ) Notice: Subject to any disclaimer, the term of this patent is extended or adjusted under 35 U.S.C. 154(b) by 30 days.

(21) Appl. No.: 09/760,172

(22) Filed: Jan. 12, 2001

(65) Prior Publication Data

US 2002/0093627 A1 Jul. 18, 2002

(51) Int. Cl.[7] ............................................... G03B 21/00
(52) U.S. Cl. ......................................................... 353/70
(58) Field of Search ....................... 353/69, 70; 33/333, 33/1 PT

(56) References Cited

U.S. PATENT DOCUMENTS

| 4,338,723 A | * | 7/1982 | Benjamin |
| 4,386,532 A | * | 6/1983 | Benjamin |
| 5,161,013 A | | 11/1992 | Rylander et al. ............ 358/160 |
| 5,369,450 A | | 11/1994 | Haseltine et al. ........... 348/745 |
| 5,455,647 A | * | 10/1995 | Fujiwara ...................... 353/69 |
| 5,548,357 A | | 8/1996 | Appel et al. .................. 353/69 |
| 5,641,957 A | * | 6/1997 | Chae ........................... 353/70 |
| 5,664,858 A | | 9/1997 | Woo ............................ 353/69 |
| 5,720,539 A | * | 2/1998 | Woo ............................ 353/69 |
| 5,752,758 A | | 5/1998 | Woo ............................ 353/69 |
| 5,795,046 A | | 8/1998 | Woo ............................ 353/69 |
| 6,302,543 B1 | * | 10/2001 | Arai et al. .................... 353/70 |
| 6,305,805 B1 | * | 10/2001 | Liebenow .................... 353/69 |

* cited by examiner

Primary Examiner—William Dowling
(74) Attorney, Agent, or Firm—Stoel Rives LLP

(57) ABSTRACT

A multimedia projector (30) includes an image processor (36) that forms an image on an image forming device (38). Illumination reflecting off the image, propagates through a projection lens (50), along a projection axis (18), and lands on a projection surface (20) as a projected image (16). An elevator mechanism (52) tilts the projection axis to position the projected image on the projection surface, which tilting causes keystoning of the projected image. In a first embodiment, an inclinometer (56) generates angle data indicative of a projection axis angle (58). A controller (34) receives the angle data and coacts with the image processor to predistort the image to compensate for the keystoning. In a second embodiment, the elevator mechanism includes an elevator shaft (60) having teeth (66) that alternately pass and obscure light as the elevator shaft undergoes movement. An optical sensor (70) generates angle data proportional to a distance moved by the elevator shaft. The angle data are processed by the controller and image processor to predistort the image to compensate for the keystoning. In a third embodiment, the teeth are replaced by a rotary encoder wheel (80) that is rotatably coupled to the elevator shaft.

10 Claims, 3 Drawing Sheets

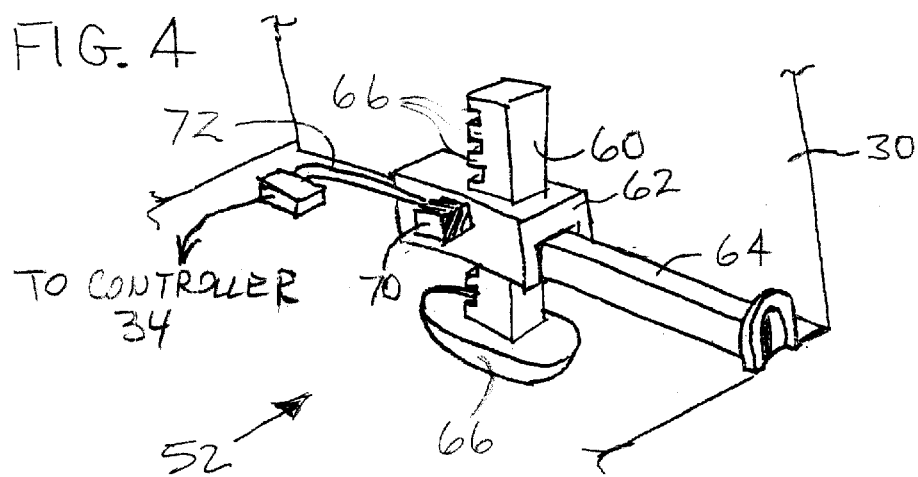
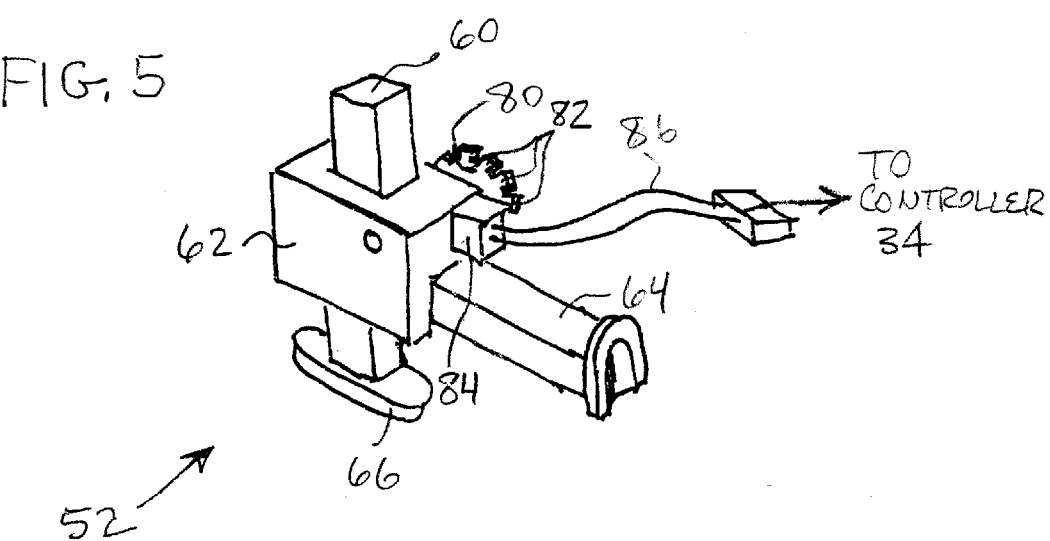

KEYSTONE DISTORTION CORRECTION SYSTEM FOR USE IN MULTIMEDIA PROJECTORS

RELATED APPLICATIONS(S)

Not Applicable

FEDERALLY SPONSORED RESEARCH OR DEVELOPMENT

Not Applicable

TECHNICAL FIELD

This invention relates to multimedia image projection displays and more particularly to an electro-mechanical system for automatically correcting keystone distortion in such displays.

BACKGROUND OF THE INVENTION

Presentations using multimedia projection display systems have become popular for conducting sales demonstrations, business meetings, and classroom instruction. As shown in FIG. 1, a multimedia projector 10 is typically supported by a surface 11 and receives analog video signals from a cable 12 connected to a video source, such as a personal computer ("PC") 14. The video signals represent still, partial-, or full-motion display images of the type rendered by the PC. The analog video signals are converted in multimedia projector 10 into digital video signals to control digitally-driven display devices, such as a transmissive or reflective liquid crystal displays or digital micro-mirror devices, to form a display image (not shown) that is cast as a projected image 16 surrounding a projection axis 18 onto a projection surface 20. If, as shown in FIG. 1, projection axis 18 is perpendicular to projection surface 20, projected image 16 will be substantially undistorted. A wide variety of such multimedia projectors are available from In Focus Systems, Inc., the assignee of this application.

Referring to FIG. 2, a necessary feature of most projectors, such as multimedia projector 10, is an elevator mechanism 22 for tilting multimedia projector 10 and/or its projection axis 18 up or down relative to surface 11 to position projected image 16 on projection surface 20. Unfortunately, this tilting causes projection axis 18 to be non-perpendicular to projection surface 20. As shown in FIG. 2, this results in trapezoidal distortion of projected image 16, which distortion is commonly referred to as keystone distortion, or keystoning, terms tracing their origins to early Keystone Corporation movie projectors.

To minimize keystoning, some prior workers have coupled the projector elevator mechanisms to various tilting mirror and lens arrangements that compensate for the keystoning. Unfortunately, such optical mechanisms are costly and prone to collecting image-obscuring dust in the optical path.

Other prior workers have employed signal processing circuits to avoid keystone correction mechanisms and their related optical path problems. For example, U.S. Pat. No. 5,664,858 for METHOD AND APPARATUS FOR PRE-COMPENSATING AN ASYMMETRICAL PICTURE IN A PROJECTION SYSTEM FOR DISPLAYING A PICTURE describes logic circuits that oppositely distort the image being projected, thereby compensating for keystoning. Yet other workers have employed the signal processing capabilities of multimedia projectors or their associated PCs to achieve similar results. An image suitable for correcting keystone distorted image 16 of FIG. 2, is shown in dashed lines in FIG. 1 as predistorted image 26. One thing these systems typically have in common is manual controls 24 that permit an operator to adjust the degree of predistortion. Manual controls 24 are adjusted until projected image 16 appears satisfactory to the eye of the operator. While manual controls 24 are usually effective in achieving an acceptably undistorted projected image 16, adjusting such controls is time-consuming and decreases the user-friendliness of multimedia projector 10, which typically includes numerous other controls as well.

What is needed, therefore, is an automatic keystone distortion correction system for multimedia projectors that requires no additional optics or manual adjustments.

SUMMARY OF THE INVENTION

An object of this invention is, therefore, to provide an automatic keystone distortion correction apparatus and method for use in multimedia projectors.

Another object of this invention is to provide a keystone distortion correction apparatus and method that requires no additional optics or manual adjustments.

A multimedia projector suitable for use with this invention includes a controller having an image processor that forms an image on an image forming device. Illumination impinging on the image forming device reflects off the image, propagates through a prism assembly and a projection lens, and along a projection axis to land on a projection surface as a projected image. An elevator mechanism tilts the projection axis relative to a supporting surface to position the projected image on the projection surface. However, the tilting of the projection axis causes keystoning of the projected image. This invention employs techniques for automatically correcting the keystoning without requiring manual operator intervention.

In a first preferred embodiment, an inclinometer is mechanically coupled to the multimedia projector to automatically generate angle data indicative of a projection axis angle. The controller receives the angle data and coacts with the image processor to predistort the image so as to compensate for the keystoning.

In a second preferred embodiment, the elevator mechanism includes an elevator shaft that is captured within a housing and is released for sliding within the housing by an operator moving an actuator that is accessible at an exterior surface of the multimedia projector. The elevator shaft further includes teeth that alternately pass and obscure light propagating through the housing as the elevator shaft undergoes movement. An optical sensor senses a number of teeth proportional to a distance that the elevator shaft moves and conveys a corresponding number of electrical signals to the controller. The electrical signals correspond to the angle data in that a counter, accumulator, register, or equivalent within the controller converts the number of pulses into data that are indicative of the projection axis angle. The electrical signals represent relative movement of elevator shaft.

In a third preferred embodiment, the teeth of the elevator mechanism are replaced by a rotary encoder wheel that is rotatably coupled to linear motion of the elevator shaft.

Alternative embodiments of the teeth may include various forms of optically readable indicia including an absolute encoder scale for generating absolute angle data that are more directly usable by the image processor for predistorting the image to compensate for the keystoning. Other suitable forms of absolute encoders include variable differential transformers and potentiometers.

Additional objects and advantages of this invention will be apparent from the following detailed description of preferred embodiments thereof which proceed with reference to the accompanying drawings.

BRIEF DESCRIPTION OF THE DRAWINGS

FIG. 4 is an isometric pictorial view of a projector elevator mechanism employing a linear encoder portion of a keystone distortion correcting embodiment of this invention.

FIG. 5 is an isometric pictorial view of a projector elevator mechanism employing a rotary encoder portion of a keystone distortion correcting embodiment of this invention.

DETAILED DESCRIPTION OF PREFERRED EMBODIMENTS

Figure 3:
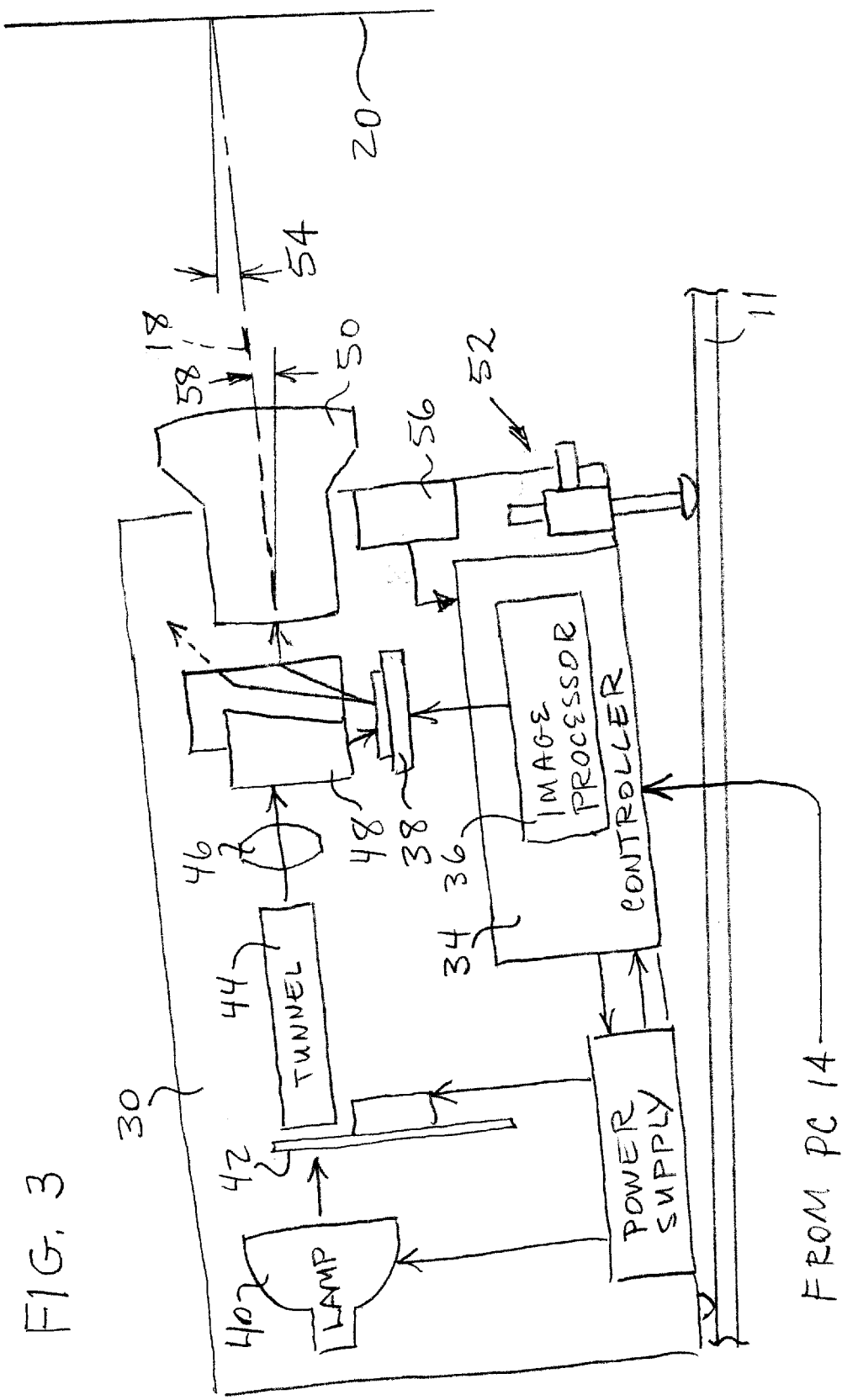
FIG. 3 is a combined schematic block diagram and pictorial side view of a multimedia projector system employing an inclinometer-based keystone distortion correcting embodiment of this invention.

FIG. 3 shows a multimedia projector 30 supported by surface 11 in which a controller 34 including an image processor 36 forms an image (not shown) on an image forming device 38, such as a deflected mirror device, reflective or transmissive liquid crystal device, or another such image forming light valve device. Multimedia projector 30 may include one of many forms of optical systems, but a preferred optical system includes a lamp assembly 40 that illuminates a rotating color wheel 42 for propagates color sequential illumination through a light integrating tunnel 44, optical elements 46, and a prism assembly 48 to image forming device 38.

Figure 1:
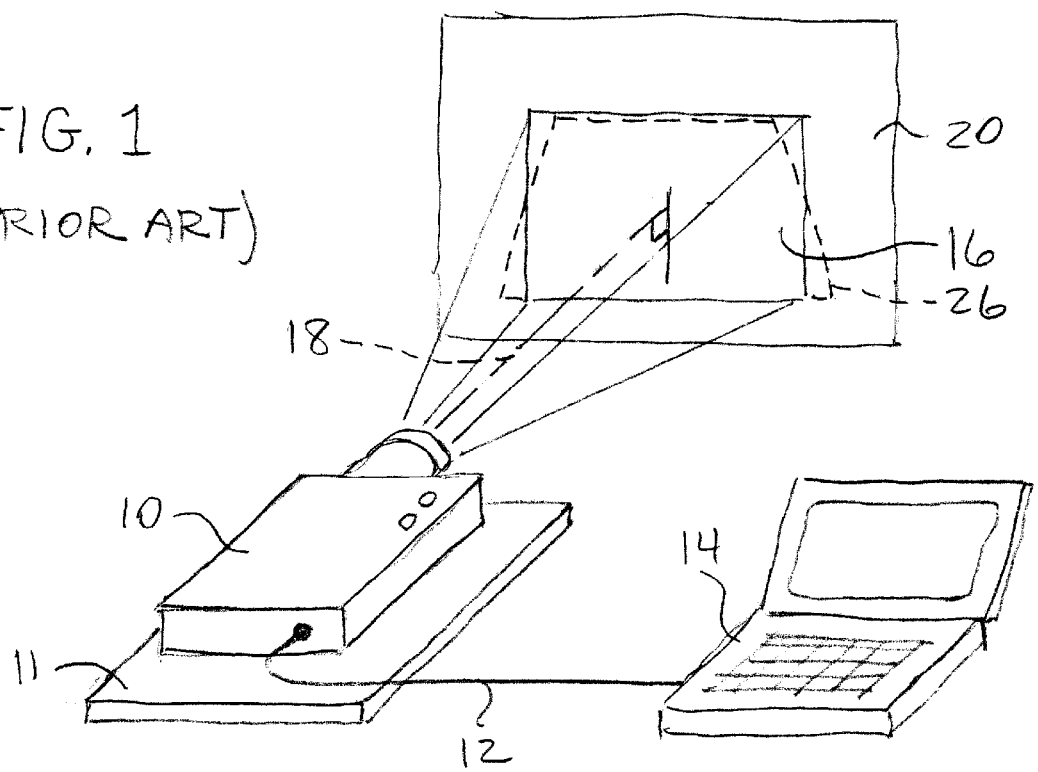
FIG. 1 is an oblique pictorial view of a prior art multimedia projection system that is suitable for use with this invention.
Figure 2:
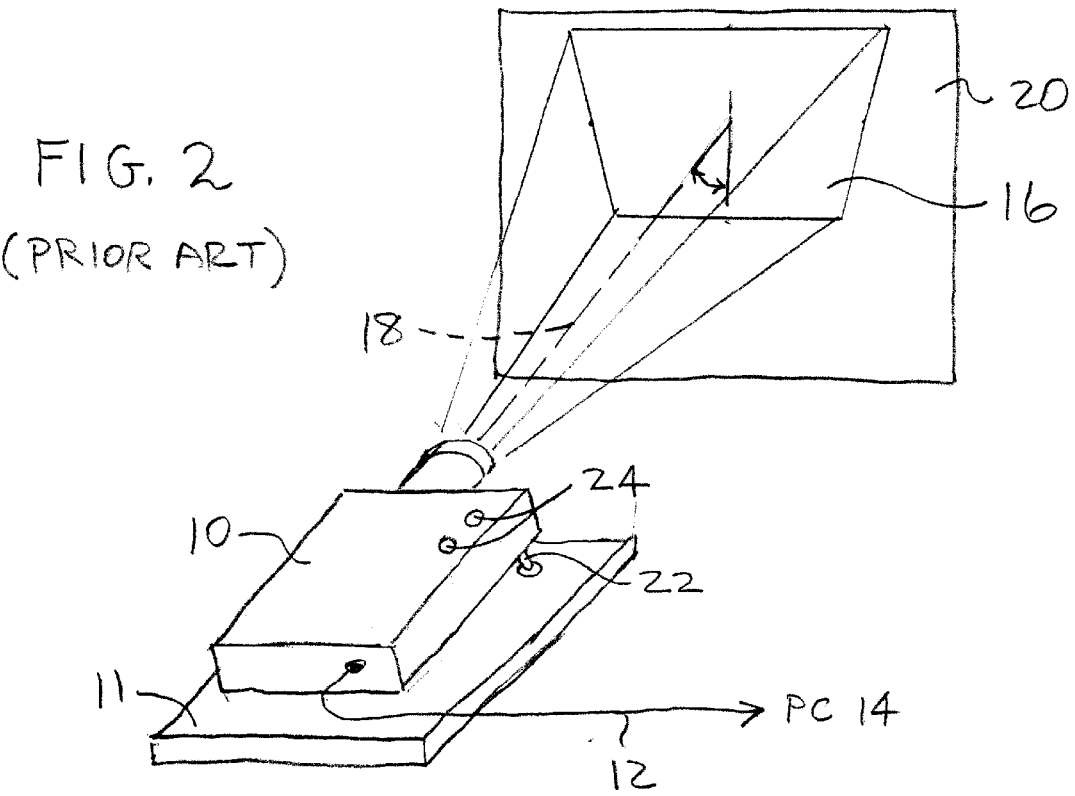
FIG. 2 is an oblique pictorial view of the prior art multimedia projection system of FIG. 1 showing keystone distortion of a projected image that results from tilting a projection axis of the projection system.

The illumination impinging on image forming device 38 reflects off the image formed thereon, propagates through prism assembly 48 and a projection lens 50, and along projection axis 18 to impinge on projection surface 20 as projected image 16 (FIGS. 1 and 2).

Multimedia projector 30 includes an elevator mechanism 52 for tilting projection axis 18 relative to surface 11 to position projected image 16 on projection surface 20, which is typically a vertically suspended projection screen. Because surface 11 is typically horizontal, it is, therefore, typically perpendicular to projection surface 20. However, the tilting of projection axis 18 relative to surface 11 causes projection axis 18 to intersect projection surface 20 at an angle 54 that is typically nonperpendicular, thereby causing keystoning of the projected image as described with reference to FIG. 2.

As described in the background of this invention, some prior multimedia projectors employed manual controls through which an operator could manually command an image processor to predistort the image to compensate for the keystoning.

This invention, however, employs improved techniques for automatically correcting keystoning without requiring manual operator intervention.

In a first preferred embodiment, an inclinometer 56 is mechanically coupled to multimedia projector 30 so as to automatically generate angle data indicative of a projection axis angle 58. Skilled persons will recognize that projection axis angle 58 is usually, but not always, substantially equal to angle 54. Inclinometer 56 is preferably a model No. ADXL202, manufactured by Analog Devices, located in Norwood, Calif. Controller 34 receives the angle data and coacts with image processor 36 to predistort the image to compensate for the keystoning.

In alternative preferred embodiments, inclinometer 56 is replaced by angle determining devices that are mechanically coupled to elevator mechanism 52.

In particular, FIG. 4 shows a second preferred embodiment in which elevator mechanism 52 includes an elevator shaft 60 that is captured within a housing 62 and is released for sliding within housing 62 by an operator moving an actuator 64 that is accessible at an exterior surface of multimedia projector 30. Thereby, multimedia projector 30 is tiltable by virtue of a foot 66 attached to an end of sliding elevator shaft 60 being positionable in response to the operator depressing actuator 64, tilting projector 30 to a suitable degree, and releasing actuator 64 to lock foot 66 in position.

In this embodiment, elevator shaft 60 includes teeth 66 that alternately pass and obscure light propagating through housing 62 as elevator shaft 60 undergoes movement. An optical sensor 70 senses a number of teeth 82 proportional to a distance that elevator shaft 60 moves and conveys a corresponding number of electrical signals through a conductor 86 that is connected to controller 34 (FIG. 3). In the second embodiment, the electrical signals correspond to the angle data in that a counter, accumulator, register, or equivalent within controller 34 converts the number of pulses into data that are indicative of projection axis angle 58. In this embodiment, the electrical signals represent relative movement of elevator shaft 60. Therefore, when elevator mechanism 52 is in its fully lowered position, a reference signal is preferably conveyed to controller 34 indicative of a reference angle value of projection axis angle 58.

Alternative embodiments of teeth 66 may include various forms of optically readable indicia including an absolute encoder scale for generating absolute angle data that are more directly usable by image processor 36 for predistorting the image to compensate for keystoning. Other suitable forms of absolute linear encoders include linear variable differential transformers and linear potentiometers. Skilled workers will understand that there are many suitable ways of coupling such linear encoders to elevator mechanism 52 and of converting the resulting angle data to a form usable by image processor 36.

FIG. 5 shows a third preferred embodiment in which teeth 66 of elevator mechanism 52 are replaced by a rotary encoder wheel 80 that is rotatably coupled to linear motion of elevator shaft 60.

In this embodiment, rotary encoder wheel 80 includes teeth 82 that alternately pass and obscure light propagating there through as elevator shaft 60 undergoes movement. An optical sensor 84 senses a number of teeth 66 proportional to a distance that elevator shaft 60 moves and conveys a corresponding number of electrical signals through a conductor 86 that is connected to controller 34 (FIG. 3). As in the second embodiment, the electrical signals correspond to the angle data in that a counter, accumulator, register, or equivalent within controller 34 converts the number of pulses into data that are indicative of projection axis angle 58. As before, the electrical signals represent relative movement of elevator shaft 60. Therefore, when elevator mechanism 52 is in its fully lowered position, a reference signal is preferably conveyed to controller 34 indicative of a reference angle value of projection axis angle 58.

Alternative embodiments of rotary encoder wheel 80 may include various forms of optically readable indicia including an absolute encoder disc for generating absolute angle data that are more directly usable by image processor 36 for predistorting the image to compensate for keystoning. Other suitable forms of absolute rotary encoders include rotary variable differential capacitors and rotary potentiometers. Skilled workers will understand that there are many suitable ways of coupling such rotary encoders to elevator mechanism 52 and of converting the resulting angle data to a form usable by image processor 36.

Suitable linear and rotary encoders and sensors include the HEDS-970X and HEDS-973X series of products manufactured by Agilent Technologies, located in Palo Alto, Calif.

Skilled workers will understand that there are many ways within their abilities to implement this apparatuses and methods of this invention. For example, this invention is adaptable to projectors that employ pivoting optics for shifting the projection axis without elevating the entire projector. Also, the angle data may be conveyed back to the PC so that application software can predistort the image in the PC before its transmission to the multimedia projector.

It will be obvious to those having skill in the art that many changes may be made to the details of the above-described embodiments of this invention without departing from the underlying principles thereof. The scope of this invention should, therefore, be determined only by the following claims.

I claim:

1. In a multimedia projector system supported by a surface in which an image is processed by an image processor and cast along a projection axis as a projected image displayed on a projection surface, the projector including an elevator mechanism for tilting the projection axis to position the projected image on the projection surface, the tilting of the projection axis to an nonperpendicular angle relative to the projection surface causing a trapezoidal distortion of the projected image, and in response thereto an operator manually commands the image processor to predistort the image to compensate for the trapezoidal distortion, an improved apparatus for correcting the trapezoidal distortion comprising:

an inclinometer coupled to the multimedia projector and generating angle data indicative of an angle of the projection axis relative to the surface; and a controller receiving the angle data and coacting with the image processor to predistort the trapzoidal distortion.

2. The apparatus of claim 1 in which the angle data include relative angle data and the controller includes an accumulator that converts the relative angle data to information employed by the image processor to predistort the image to compensate for the trapezoidal distortion.

3. The apparatus of claim 1 in which the angle data include absolute angle data that are employed by the image processor to predistort the image to compensate for the trapezoidal distortion.

4. In a multimedia projector system supported by a surface in which an image is processed by an image processor and cast along a projection axis as a projected image displayed on a projection surface, the projector including an elevator mechanism for tilting the projection axis to position the projected image on the projection surface, the tilting of the projection axis to an nonperpendicular angle relative to the projection surface causing a trapezoidal distortion of the projected image, and in response thereto an operator manually commands the image processor to predistort the image to compensate for the trapezoidal distortion, an improved method for correcting the trapezoidal distortion comprising:

coupling an inclinometer to the multimedia projector;

generating angle data indicative of an angle of the projection axis relative to the surface; and processing the angle data to predistort the image to compensate for the trapezoidal distortion.

5. The method of claim 4 which the angle data include relative angle data and the processing further includes converting the relative angle data to information employed by the image processor to predistort the image to compensate for the trapezoidal distortion.

6. The method of claim 4 in which the angle data include absolute angle data that are employed by the image processor to predistort the image to compensate for the trapezoidal distortion.

7. In a multimedia projector system supported by a surface in which an image is processed by an image processor and cast along a projection axis as a projected image displayed on a projection surface, the projector including an elevator mechanism for tilting the projection axis to position the projected image on the projection surface, the tilting of the projection axis to an nonperpendicular angle relative to the projection surface causing a trapezoidal distortion of the projected image, and in response thereto an operator manually commands the image processor to predistort the image to compensate for the trapezoidal distortion, an improved apparatus for correcting the trapezoidal distortion comprising:

an automatic angle determining device including at least one of a variable differential transformer and a potentiometer that are coupled to the elevator mechanism for generating absolute angle data indicative of an angle of the projection axis relative to the surface; and a controller receiving the angle data and coacting with the image processor to predistort the image to compensate for the trapezoidal distortion.

8. The apparatus of claim 7 in which the elevator mechanism includes an elevator shaft and an actuator and in which the elevator shaft is positionable in response to the operator moving the actuator.

9. The apparatus of claim 7 in which at least one of the variable differential transformer and the potentiometer include a linear actuator.

10. The apparatus of claim 7 in which at least one of the variable differential transformer and the potentiometer include a rotary actuator.

\* \* \* \* \*